(12) United States Patent
Calmes

(10) Patent No.: US 8,888,067 B1
(45) Date of Patent: Nov. 18, 2014

(54) THERMOPLASTIC LINER FOR CASTING TEXTURES AND OBJECTS INTO POURED WALL

(75) Inventor: Shane Calmes, Onalaska, WI (US)

(73) Assignee: Advanced Formliners, LLC, Onalaska, WI (US)

( * ) Notice: Subject to any disclaimer, the term of this patent is extended or adjusted under 35 U.S.C. 154(b) by 1422 days.

(21) Appl. No.: 12/047,128

(22) Filed: Mar. 12, 2008

Related U.S. Application Data

(60) Provisional application No. 60/906,435, filed on Mar. 12, 2007.

(51) Int. Cl.
*B28B 7/36* (2006.01)
*E04G 9/10* (2006.01)
*E04G 17/00* (2006.01)
*B28B 7/00* (2006.01)

(52) U.S. Cl.
CPC ............... *B28B 7/0073* (2013.01); *E04G 9/10* (2013.01)
USPC .............................................. 249/15; 249/16

(58) Field of Classification Search
CPC ............... E04G 9/04; E04G 9/05; E04G 9/06; E04G 9/08; E04G 9/10; E04G 17/00; E04C 2/24; E04C 2/243; E04C 2/246; E04C 2/296; E04C 2/38; E04C 2/386; E04C 2/46; B28B 7/0064; B28B 7/0073; B28B 7/36; B28B 19/0053; B28B 19/0061; B28B 19/0069
USPC .......... 249/15, 16, 96; 52/384, 385, 386, 387, 52/389; 428/163, 172, 180
See application file for complete search history.

(56) References Cited

U.S. PATENT DOCUMENTS

| | | | | | |
|---|---|---|---|---|---|
| 636,200 | A | * | 10/1899 | Frink | 52/386 |
| 777,656 | A | * | 12/1904 | Banning | 52/386 |
| 1,945,024 | A | * | 1/1934 | Coil et al. | 428/180 |
| 2,114,710 | A | * | 4/1938 | Holcomb | 52/387 |
| 2,627,100 | A | * | 2/1953 | Jelks | 249/16 |
| 2,654,935 | A | * | 10/1953 | Ager | 249/16 |
| 2,858,247 | A | * | 10/1958 | De Swart | 428/180 |

(Continued)

FOREIGN PATENT DOCUMENTS

FR        2292090      *  6/1976  ............... E04G 9/10

*Primary Examiner* — Michael Safavi
(74) *Attorney, Agent, or Firm* — Vidas, Arrett & Steinkraus

(57) ABSTRACT

A re-useable liner that can be used to make textures as well as secure and seal objects within a form for a poured wall. The liner and the method of making the liner by thermoforming layers which comprises a polyolefin foam sheet, a thermoplastic elastomer, and a polyolefin plastic sheet into a form liner that can imprint various shapes and textures into a poured wall or can be thermoformed into a liner which includes a plurality of joints which can secure objects in a form for a poured wall. The joints between the objects can be formed to be semicircular or flat and also with a variety of textures. The invention includes, a cavity between layers in the joint to allow maximum flexibility of oversized objects, an expansion/contraction absorption device, a channel along the bottom of the grout joint that allows the material layers to stretch, a built in mechanism to attach the apparatus to metal forms using magnetic sheets, an adhesive layer on the edges in order to make the liner larger by joining together one liner to another using an adhesive on the sides and the variable horizontal and vertical joint widths within the liner to make the wall panel look natural.

11 Claims, 8 Drawing Sheets

(56) References Cited

U.S. PATENT DOCUMENTS

| | | | | |
|---|---|---|---|---|
| 2,876,927 A | * | 3/1959 | Henning | 52/384 |
| 2,964,800 A | * | 12/1960 | Dorsett | 249/16 |
| 2,974,716 A | * | 3/1961 | Fourness | 428/180 |
| 3,382,640 A | | 5/1968 | Thomas et al. | |
| 3,411,257 A | * | 11/1968 | Yaremchuk | 52/384 |
| 3,419,457 A | * | 12/1968 | Bleasdale | 428/180 |
| 3,783,087 A | * | 1/1974 | Vecchiarelli | 428/180 |
| 3,801,405 A | * | 4/1974 | Corkery et al. | 428/138 |
| 4,011,702 A | * | 3/1977 | Matyas | 52/387 |
| 4,133,481 A | * | 1/1979 | Bennett | 428/172 |
| 4,393,108 A | * | 7/1983 | Barker et al. | 428/44 |
| 4,858,410 A | * | 8/1989 | Goldman | 52/387 |
| 4,889,758 A | * | 12/1989 | Rinkewich | 428/180 |
| 4,923,733 A | * | 5/1990 | Herbst | 428/180 |
| 4,963,054 A | * | 10/1990 | Hayashi | 52/387 |
| 5,006,011 A | * | 4/1991 | Hiyashi | 52/387 |
| 5,038,541 A | | 8/1991 | Gibbar, Jr. | |
| 5,242,738 A | * | 9/1993 | Furuya et al. | 428/172 |
| 5,268,137 A | * | 12/1993 | Scott et al. | 249/96 |
| 5,268,213 A | * | 12/1993 | Murakami et al. | 428/163 |
| 5,277,009 A | * | 1/1994 | Yamaguchi et al. | 52/387 |
| 5,489,462 A | * | 2/1996 | Sieber | 428/163 |
| 5,637,236 A | * | 6/1997 | Lowe | 216/39 |
| 5,701,710 A | | 12/1997 | Tremelling | |
| 5,787,667 A | | 8/1998 | Sheahan et al. | |
| 5,822,937 A | * | 10/1998 | Mahony et al. | 52/387 |
| 5,900,180 A | | 5/1999 | Scott et al. | |
| 6,041,567 A | | 3/2000 | Passeno | |
| 6,059,257 A | | 5/2000 | Scott, III | |
| 6,127,020 A | * | 10/2000 | Bacon et al. | 428/161 |
| 6,164,037 A | | 12/2000 | Passeno | |
| 6,335,073 B1 | * | 1/2002 | Kock et al. | 428/163 |
| D479,614 S | | 9/2003 | Scott et al. | |
| 7,896,309 B1 | * | 3/2011 | DiGiammo | 249/205 |
| 2004/0200168 A1 | * | 10/2004 | Takagi et al. | 52/415 |
| 2004/0226230 A1 | * | 11/2004 | Ritzer | 52/204.1 |
| 2005/0097827 A1 | | 5/2005 | Jordan | |
| 2006/0091282 A1 | * | 5/2006 | Walters | 249/16 |
| 2006/0180731 A1 | * | 8/2006 | Scott et al. | 249/15 |

* cited by examiner

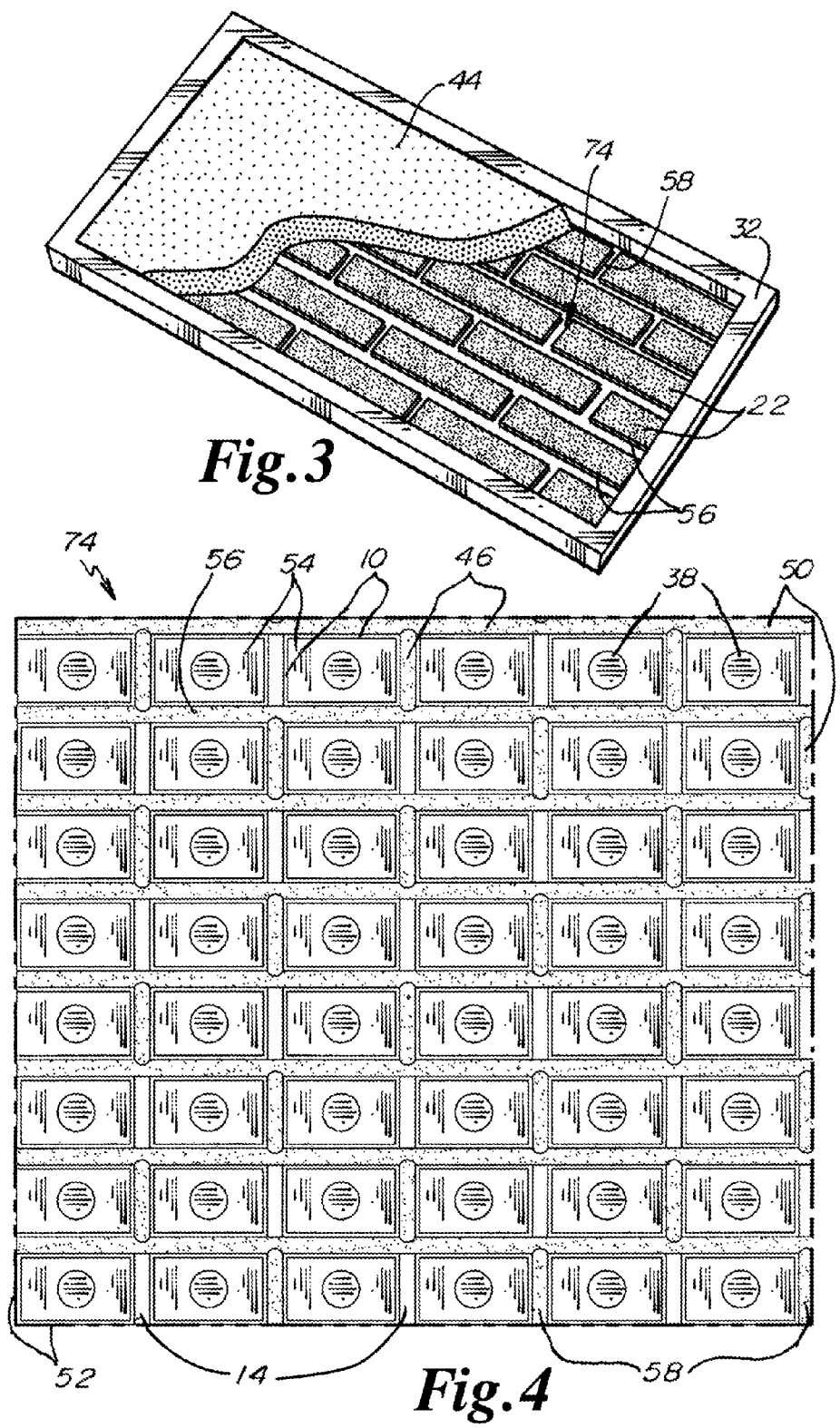

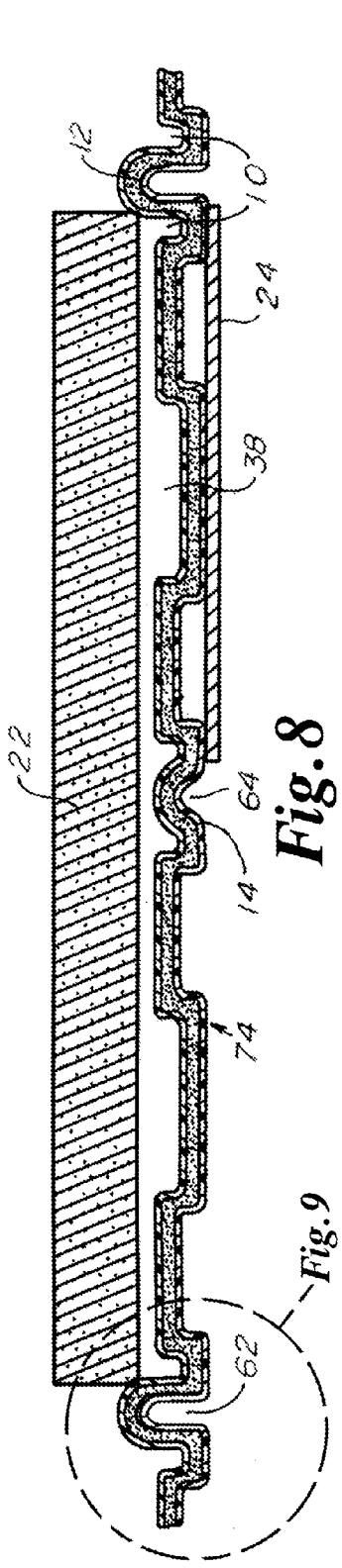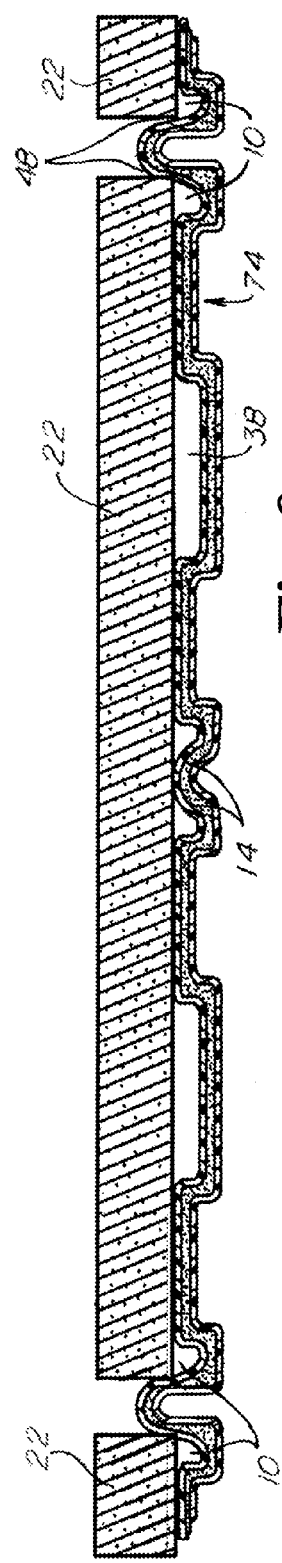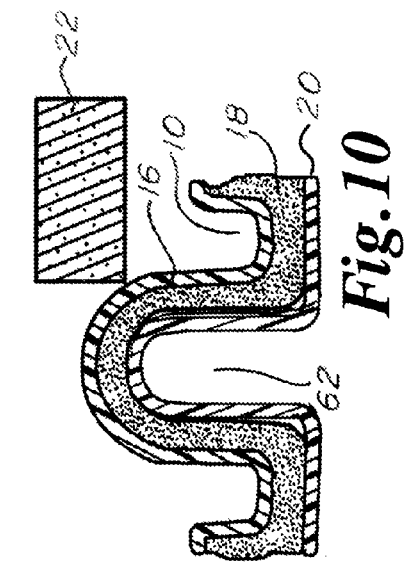

THERMOPLASTIC LINER FOR CASTING TEXTURES AND OBJECTS INTO POURED WALL

CROSS-REFERENCE TO RELATED APPLICATIONS

This application claims priority to U.S. Application No. 60/906,435, filed Mar. 12, 2007, the entire contents of which is hereby incorporated herein by reference.

BACKGROUND OF THE INVENTION

This invention in general relates to a re-usable liner that can be used for making textures into concrete, as well as a form liner for securing and sealing objects in a form so that when a wall is poured the objects remain fixed to the surface by being partially embedded when the form and the liner are withdrawn.

The construction industry in the last several decades has taken advantage of the cost and structural benefits of simulated brick or simulated stone walls over traditional masonry, and decorative designs. The method typically uses a form liner to create shapes and textures to create a decorative poured wall that can later be stained to look like traditional masonry and designs. A liner has also been used to place real brick, pavers or stones within the liner itself. The liner typically consists of a number of recessed areas separated by joints. The recessed areas are where the pavers, brick or stone are placed and the joints between the recessed areas holds the brick, pavers or stones from moving out of place. Typically a concrete slurry is then poured into the form and allowed to cure. The joints form a "grout line" around the pavers bricks or stones when concrete is poured into the form. Once the concrete is cured and the form and the liner is removed, a simulated wall is revealed with the stone, brick or pavers exposed on the surface and concrete exposed between the brick, stones or pavers which is the grout line. The goal is to make the poured wall look like real masonry. Architects criticize that using a liner to create textures and then stain makes the wall look fake, that embedding bricks or pavers creates a wall that does not look like natural masonry because the grout joints are all the same width, that bricks are too uniform in size and, in some applications, that the created joints are flat rather than semicircular as the joints of hand laid brick.

Over the years there have been a number of different types of form liners have been used, each with various drawbacks. All of these liners added to cost and labor, especially when forming inlayed brick into poured walls.

Solid urethane liners have been used for a number of years, but not for embedding objects in a poured wall when there is a full tooled joint. A full tooled joint is a joint that has a semicircular top and the sides of the joint and extends down to touch the bottom part of the brick that fits into the cavity. The full "tooled joint" or a semicircular joint, is the preferred architectural design because it is the standard masonry joint between the brick. The joint used with urethane liners is a flat joint, also called raked joint urethane liners. Such liners are expensive, labor intensive and the result is typically an unnatural looking wall. They are not used in the precast industry when used to embed objects into the surface of a wall with a natural full tooled joint; not only because of the expensive price per square foot but it is difficult to get urethanes soft enough to seal bricks and allow for variable brick sizes to fit into the cavity between the joints.

U.S. Pat. No. 5,900,180 is an attempt for an inexpensive way of producing flat joint or raked joint liners using foam. It is manufactured by die cutting or routing a foam sheet into a grid pattern with square grout joints and gluing it to a paper backing. The areas that are die cut, specifically each vertical edge of every grout joint is a problem because the concrete sticks to the exposed cells of the foam. When the form is removed, the liner breaks apart and the foam joints are stuck in the concrete panel between the brick pavers, resulting in costly cleaning due to manually scraping out the foam pieces from the grout lines of the simulated brick wall. The design disclosed in U.S. Pat. No. 5,900,180 does not allow for variable sized brick because it was designed so that the foam grid is glued to a flat backing that is not flexible, causing the foam grid to be fixed where the foam meets the backing. The recessed area where brick pavers seat require very tight tolerances in the brick pavers. If the bricks are too large, the foam material does not have give and pushes the brick upward out of the recessed area resulting in a misalignment. The expensive cost of grinding the brick, waxing the brick and manually scraping the foam out of the finished wall has made this liner an undesirable product to use. Furthermore, this reference with its flat and uniform grout joints segregates this liner to another type of architectural look, a liner that makes the wall look fabricated and not like real masonry.

Prior plastic liners such as the VersaLiner™ panel manufactured by Innovative Brick Systems, Inc. of Bloomfield, Colo. have been able to achieve a tooled joint but in doing so they have encountered many problems due to the rigid nature of the panel material and particularly the rigid nature of the semicircular joints between the recessed brick-receiving regions. These hard plastic joints define uniform brick-receiving regions in the liner panel which, in turn, require the use of brick pavers that are cut to very precise tolerances to fit close to the grout joint. The problem is that the cementous material seeps around the joint and to the brick face because there is no seal by the hard plastic against the brick edge. Further, the grout lines of plastic liners are not malleable and the grout joint cannot adjust to oversized brick pavers (i.e. $\frac{1}{16}$ inch or more out of specification in either the length or the height dimension) will not be seated correctly in the liner, partially seated on top of the grout joint and not able to seat in the cavity between the grout joints causing unacceptable visual defects in the finished wall. In order to ensure that the finished brick wall may be cleaned of any concrete material on the front face of the bricks, it is typically necessary to use specialized brick pavers that have had their faces coated with wax. Upon completion of the formed wall and the removal of the plastic liner panels, a hot water (high pressure) spray is applied to the face of the brick wall to remove the wax coating and any accumulated concrete material. This process is very labor intensive and costly to the contractor. It is worthy to note that the prewaxed brick pavers are expensive and even more expensive when the brick edges must be ground to fit the exact dimensions of the hard plastic liner, nearly doubling the cost of a standard brick paver. The plastic liners are not thermally stable, rising temperatures can cause the liner to expand and create even larger gaps between the brick pavers and the joints. Lower temperatures can cause the bricks to pop out of the brick cavity and seat on top of the grout joint. With all of the precision needed in the rigid plastic liner and the brick to make a brick faced wall, the result is a prefabricated wall that does not look hand laid. This liner is typically used one time and then discarded because it becomes destroyed when the concrete wall panel is removed from the form.

U.S. Publication 2006/0180731 A1 is another attempt to produce a tooled joint liner but has its own problems. U.S. Publication 2006/0180731 A1 is a laborious production method in which polystyrene extruded foam head joints are formed and cut separately from the polystyrene extruded foam bed joints. The individual joints are individually positioned in grooves on a conveyor belt track and the backing sheet is run simultaneously with the backing sheet under a heat roller which attaches the individual foam joints to the backing sheet. The recessed areas where the brick pavers are laid is sugar coated to act as a retarding agent for leaking concrete because the device does not completely seal the brick. The strips are glued directly to the backing and the recessed area has no flexibility because the bottom is glued to the paper. The reference states that when a brick is oversized, the contractor can detach the individual head joint and move it over and reattach the joint so that the brick will fit in. This creates a problem for the adjacent brick because the recessed cavity will be too short. The contractor must try to find a very small brick, cut the brick down or move the next joint over which continues to compound the problem. At some point in the row, brick pavers must be cut or ground which is very expensive and labor intensive. The reference tries to address the problem if a brick is too long by detaching the grout joint, but the reference liner fails to address the problem of a brick being too wide. This results in the probability that the contractor would purchase expensive precut brick and prewaxed brick to be safe from onsite grinding and extensive cleaning. Due to its material makeup, the reference liner can only be used once, the contractor must layout new liner for each pour which adds even more to the labor cost. Furthermore the grouts are made all with the exact same shape and the end results in prefabricated looking brick wall.

There remains a need for a form liner capable of being used with bricks and/or other inserts of various sizes without modification, capable of forming joints having the visual characteristics of a tooled mortar joint, capable of creating a wall section with realistic imperfections, and capable of being used multiple times.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, the invention provides an alternative material to be used as a form liner to form shapes and textures into a poured wall, and solves the above problems of a liner for partially embedding objects into a poured wall so that the face of the object is revealed in accordance with this invention. The liner can be placed within a form and holds objects in a desired pattern when the material is poured into the form and it covers the liner. In some embodiments, the liner is made of materials that are thermoformed into a continuous pattern of joints that define recessed areas in which stone, pavers, bricks or other objects can be placed in order to be cast into the poured wall.

In some embodiments, a re-useable liner can be used to imprint various shapes and textures as well as a plurality of joints which secure and seal objects within a form for a poured wall. The liner and the method of making the liner by thermoforming layers which comprises of a polyolefin foam sheet, a thermoplastic elastomer, and a polyolefin plastic.

In some embodiments, there is a closed cavity between the top layer and bottom layer of material that make up the grout joints of the liner.

In some embodiments there is an anti-expansion and contraction groove that is placed in the center of the recessed area and aligned with the vertical grout joints in the adjacent coursing to cushion any expansion or contraction due to temperature change.

In some embodiments the ability to attach one liner to another using adhesive on the butting ends to make a larger that would fit in a form.

In some embodiments is the use of a magnetic backing to be glued to the bottom layer to attach the liner when using metal forms.

In some embodiments is the design of the "tooled joint" or semicircular grout joint that is rounded at the top that extends below the plane of the recessed area where the objects are placed.

In some embodiments is variable width of the vertical grout joints all in one particular liner that make the simulated masonry look real.

In some embodiments is variable width of the horizontal grout joints all in one particular liner that make the simulated masonry look real.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

FIG. 3 depicts concrete poured into the form shown in FIG. 2.

FIG. 4 is a front elevation view of an embodiment of the liner.

FIG. 8 is a sectional view of FIG. 5 showing the bottom elevation and an embodiment of a liner having three layers. The top and bottom layers are represented with hatching and dashed lines. The figure shows an oversized brick above the liner not yet placed into the recessed area between the grout joints.

FIG. 9 is an enlarged sectional view of a portion of FIG. 8 on the tooled joint, showing an embodiment of a liner having three layers. The top and bottom layers are represented with dashed lines showing they may not always be present.

FIG. 10 is a sectional view of FIG. 5 showing the bottom elevation and an embodiment of a liner having three layers. The top and bottom layers are represented with hatching and dashed lines. The figure shows the oversized brick from FIG. 8 placed into the recessed area between the grout joints.

DETAILED DESCRIPTION OF THE INVENTION

Figure 1:
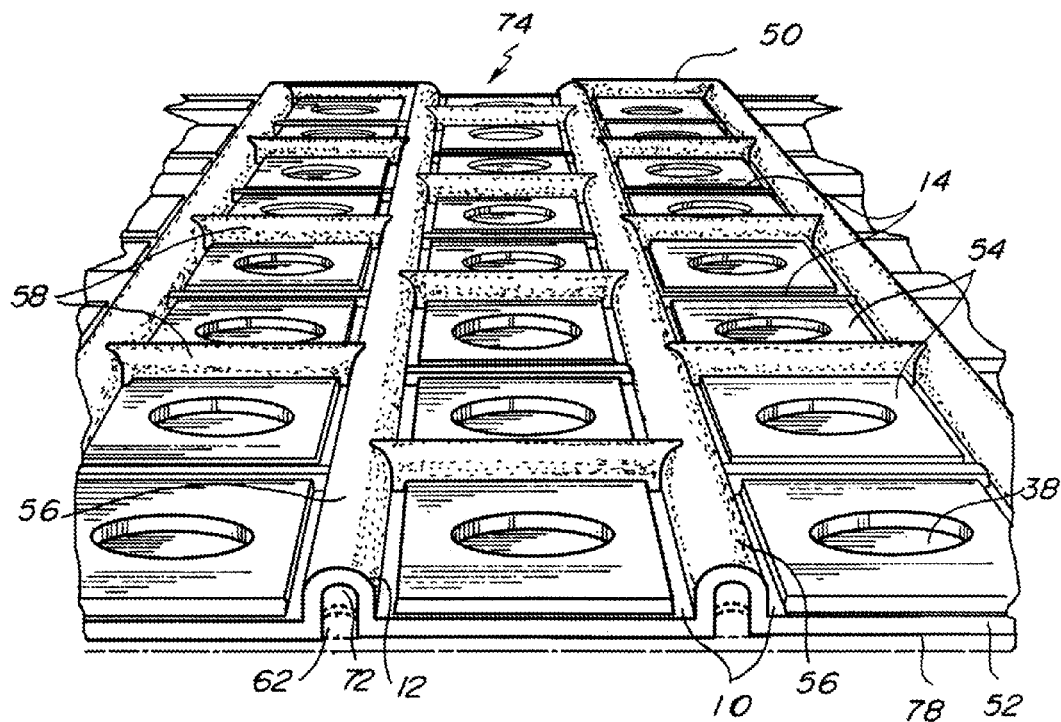
FIG. 1 is a perspective view an embodiment of a liner.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the Figures shall refer to like features unless otherwise indicated.

Figure 2:
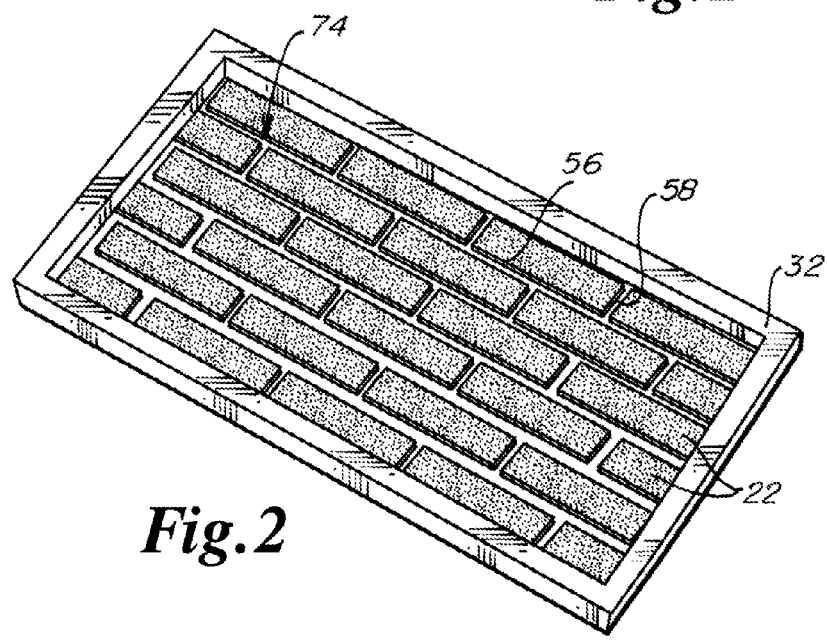
FIG. 2 is a perspective view of an embodiment of the liner set inside of a horizontal form for casting concrete with bricks placed in the liner.

FIG. 1 illustrates an embodiment of the invention comprising a liner 74 designed to accommodate a set of bricks. The liner 74 of the present invention is used to position the bricks 22 into a desired pattern, for example as shown in FIG. 2. The liner 74 can be placed in a form 32 and a cementous material can be poured into the form so that the cementous material 44 covers all of the brick 22 and the joints 56, 58 of the liner 74 between the brick 22, for example as shown in FIG. 3. When the cementous material 44 cures, the form 32 is removed and the liner 74 is removed from the wall. The bricks 22 have become embedded into the cementous material 44 with the face of the brick 22 exposed. The cementous material 44 between the brick 22 defines the grout lines, which comprise horizontal rows 56 and vertical columns 58. Hereinafter, the rows 56 and columns 58 may be referred to as "joints."

FIGS. 1 and 4 illustrate a liner 74 having a plurality of joints 56 and 58 arranged in a grid. In some embodiments, the liner 74 can be formed from thermoplastic materials. Specifically, the liner 74 can include a plurality of horizontal joints 56 extending parallel to one another, and a plurality of vertical joints 58 extending parallel to one another. The grid defines define a plurality of recessed areas 54 that can receive the brick 22, and thus can comprise brick locations. An upper surface of each brick location/recessed area 54 can be oriented at a predetermined height. Each row 56 comprises a raised portion that is raised above the predetermined height of the recessed areas 54. Similarly, each column 58 comprises a raised portion that is raised above the predetermined height of the recessed areas 54.

The vertical columns 58 and horizontal rows 56 can have a sandblast texture 46 on the raised upper surface that simulates a tooled mortar joint in a hand lay-up mason wall. The vertical 58 and horizontal joints 56 can have different shapes and textures 46 as well, but the preferred shape in the industry, and one that looks like real masonry, is the semicircular or concave joint 12 as shown in FIG. 1.

Figure 16:
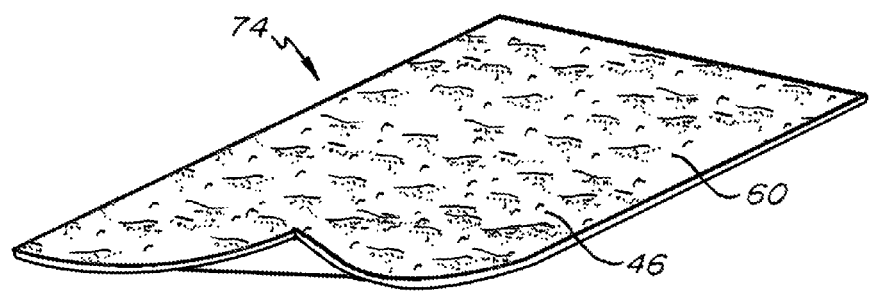
FIG. 16 is a perspective view of a liner that creates textures and shapes in the face of a concrete wall.

In various embodiments, any suitable textures 46 (see FIG. 16) and shapes for the "grout joints" 12 may be used in this invention. The grout joints 12 are arranged to give the ½ running bond pattern in FIG. 4 which is the most common in the industry. This invention is not limited to this pattern, as it can be made into custom decorative brick 22 patterns as well as the other bond patterns such as ¼, ⅓ and full.

Figure 6:
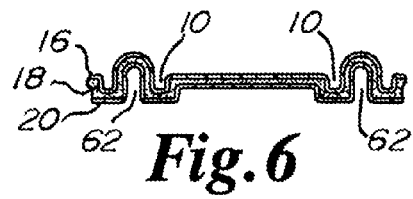
FIG. 6 is a sectional view of FIG. 5 showing the right elevation and an embodiment of a liner having three layers. The top and bottom layers are represented with hatching and dashed lines.
Figure 7:
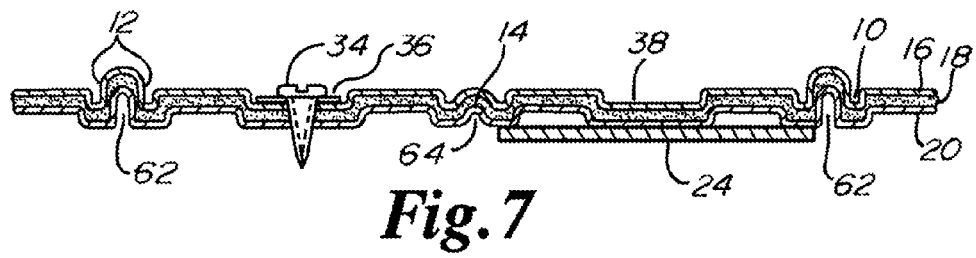
FIG. 7 is a sectional view of FIG. 5 showing the bottom elevation and an embodiment of a liner having three layers. The top and bottom layers are represented with hatching and dashed lines. The figure includes a screw with washer and a magnetic sheet.
Figure 8A:
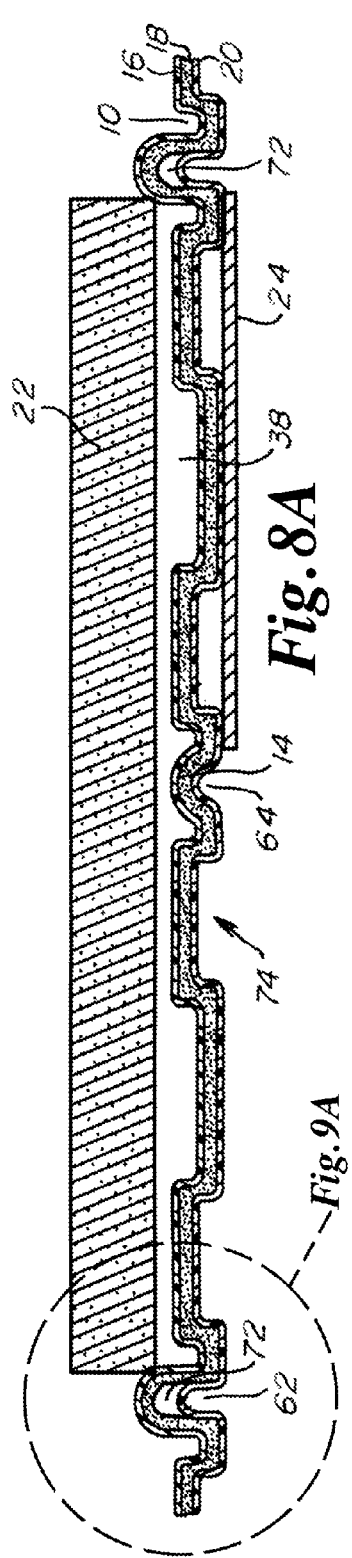
FIG. 8a. is a sectional view of FIG. 5 showing the bottom elevation and an embodiment of a liner having three layers. The top and bottom layers are represented with hatching and dashed lines. The figure shows an oversized brick above the liner not yet placed into the recessed area between the grout joints wherein the grout joint structure has a closed cavity.

Referring to FIGS. 6 and 7, in some embodiments, a liner 74 can comprise multiple layers of material, including a first layer 16, a second layer 18 and a reinforcing or third layer 20. In some embodiments, the layers 16, 18, 20 can be thermoformed by methods including vacuum forming, compression molding, compression forming, pressure molding, pressure forming, injection molding, blow molding, embossing and heat molding. In some embodiments these layers 16, 18, 20 can be co extruded into a single sheet as then thermoformed into one liner 74. In some embodiments, one or more layers can be extruded separately and then built-up before thermoforming into a single liner 74, for example as shown in FIG. 8a., FIG. 9a., and FIG. 10a, which allows for a cavity 72 between various layers.

In some embodiments, the various layers can comprise polyolefin foam, thermoplastic elastomer and/or polyolefin plastic. Layers 16, 18, 20 shown in FIGS. 6-10a will be described as follows: the top layer will be called layer I 16, the middle layer will be called layer II 18 and the bottom layer will be called layer III 20.

In some embodiments, layers I 16, II 18 or III 20 can comprise solid polyolefin plastic. The solid polyolefin plastic is desirable for giving strength to the liner 74. Polyolefin plastics have a high tear strength, a good flexural modulus and are very tough. They can withstand being used to cast concrete 44 several times without wearing out or chemically breaking down. Materials used in the casting process, such as concrete and other building materials, are less likely to stick or bond to polyolefin plastics than other materials, so the liner 74 can be cleaned easily between casting operations. The solid polyolefin plastic also does not expand or contract as much as other materials, such as polyolefin foams, so the solid plastic can be used in some embodiments to stop the lineal expansion and contraction of the foam layer, for example due to temperature change.

In some embodiments, a solid layer of plastic is 1/16 inch or less in thickness. In some embodiments a solid layer of plastic is 1/32 inch or less in thickness. In some embodiments, a solid layer of plastic is 0.020 inch or less in thickness.

In some embodiments, one or more layers 16, 18, 20 can consist of a polyolefin plastic, such as polypropylene (PP), and can further be filled with talc and extruded into sheets and then thermoformed. The advantage for using a talc filled polypropylene is: the coefficient of expansion is up to 4 times less than the coefficient of expansion of referenced liners, low cost, good chemical resistance, good resistance to stress cracking even when in contact with detergents or polar hydrocarbons which are in concrete release agents, very good fatigue resistance for multiple uses, retains mechanical properties at elevated temperatures such as high temperature steam curing for concrete 44, mechanical properties are unaffected by submersion in water.

In some embodiments, one or more layers 16, 18, 20 can consist of a polyolefin such as polyethylene (PE), which has excellent chemical resistance, very good process ability and very low cost.

In some embodiments, one or more layers 16, 18, 20 can consist of a polyolefin such as Ethylene Vinyl Acetate, which is highly flexible even at low temperatures (−25 C), highly compatible with thermoplastic elastomers, has excellent tear resistance to withstand stripping out of concrete 44 from the form 32 and liner 74, has excellent resistance to stress cracking for multiple re-uses and has a good UV and ozone resistance so it can be stored and used outside without deterioration.

In some embodiments, one or more layers I 16, II 18, or III 20 can comprise polyolefin foam. In some embodiments where the layer I 16 comprises polyolefin foam, the thermoforming process ensures that the foam cells are not exposed, and therefore ensures that the cementous material 44 does not stick to the liner 74 when the form 32 is taken away from the cured cementous material 44. By thermoforming a polyolefin foam, it heats the foam and closes the cells at the surface, creating a protective shell that makes the liner 74 able to be used with concrete 44 in such that the liquid concrete 44 will cannot fill any foam cells because the foam cells are not exposed to the concrete 44.

Previous attempts at using foam that was not thermoformed failed because the cut foam exposed the foam cells allowed the concrete 44 to fill the cells before curing, which created much labor in cleaning the concrete 44 because foam particles become stuck to the concrete 44. Further, such a liner was a 'single use' liner because the foam would be destroyed in the process.

A thermoformed polyolefin foam that has no open cells will resist sticking to the concrete, and can be therefore used several times. Often, a thermoformed polyolefin foam can be used until the friction of the bricks 22 wears through the protective surface layer created in thermoforming process. In some embodiments the polyolefin foam is crosslinked.

Referring again to FIG. 1, in some embodiments, the liner 74 can be attached to another substrate 78 such as fiberglass, paper, cardboard, wood, plastic, etc., for example by bonding. The substrate 78 can act to structurally reinforce the liner 74, bracing the liner 74 against dimensional changes such as expansion and contraction, for example due to temperature changes.

In some embodiments, use of a substrate 78 can form an air pocket or closed cavity 72 underneath the joints 56, 58. A cavity 72 can increase the range of brick sizes that are suitable for use with the form liner 74, as the joints 56, 58 more easily conform to oversized bricks.

Referring to FIG. 10, in some embodiments, a layer of polyolefin foam can also increase the range of brick sizes that are suitable for use with the form liner 74. The foam can be used to cushion and seal an oversized brick 22, as the foam is deformable similar to the aforementioned cavity 72. FIG. 10 illustrates how a brick 22 can fit into the recessed area 54 (see FIG. 8) between the joints 56, 58 of the liner 74 when foam is used in either layer I 16 or layer II 18. FIG. 10 shows layer II 18 as a foam layer, and the foam compressing and conforming 48 in response to loading applied by the brick 22. The flexible foam squeezes as the oversized brick 22 is placed into the recessed area 54 between the joints 56, 58, and the liner 74 seals the around the brick 22, which prevents cementous material 44 from leaking into the recessed area 54. This can provide an economical advantage, as it is not necessary to wax or grind the brick 22.

In some embodiments, one or more layers 16, 18, 20 can comprise or consist of a polyolefin foam called EVA foam or Ethylene Vinyl Acetate foam, which is highly flexible even at low temperatures (−25 C). It is highly compatible with thermoplastic elastomers and can be thermoformed along with solid polyethylene. EVA foam exhibits excellent tear resistance and resistance to stress cracking, which provides for multiple re-uses of the liner 74. EVA foam further has good UV and ozone resistance, so it can be stored and used outside without deterioration.

In some embodiments, one or more layers 16, 18, 20 can comprise or consist of a polyolefin foam that is made from LDPE or low density polyethylene foam, which is also compatible with polyethylene solid plastics in the thermoforming process. LDPE foams have excellent chemical resistance, especially against release agents used to form concrete 44. LDPE can be co extruded easily with PE and thermoplastic elastomers into a single sheet prior to thermoforming. Some embodiments can comprise or consist of polyolefin foam that is made of PP which is compatible to thermoforming with polypropylenes.

In some embodiments, a layer I 16, II 18 or III 20 comprises a thermoplastic elastomer that is strong and flexible, allowing the liner 74 to be used many times. The thermoplastic elastomer is able to stretch and accommodate various sized bricks 22, and also provides manufacturing benefits over other materials. A thermoplastic elastomer can be a thin sheet that is lighter weight and less expensive than possible with other materials. Another advantage is that the thermoplastic elastomer allows for forming a thin layer. The joints 56, 58 are able to bend and stretch, conforming to an oversized brick 22 while sealing the brick 22 simultaneously.

In some embodiments, a thermoplastic elastomer can comprise PP/EPDM (polypropylene/ethylene propylene diene monomer) which thermoforms very well and has advanced features, they are typically resistant to oils and UV light whereas other reference liners break down with form oil and sun exposure. PP/EPDM has great abrasion resistance to withstand the abrasion due to insertion of bricks 22 and subsequent removal of the liner 74.

In some embodiments, a thermoplastic elastomer can comprise polyvinylchloride or TPE/PVC, which have excellent flexural fatigue resistance for multiple reuses, resistance to oils and chemicals to withstand a variety of inexpensive release agents used in the concrete industry.

In some embodiments, a thermoplastic elastomer can comprise one or more thermoplastic elastomers such as COPE (copolyester elastomer), EVA/VC (ethylene vinyl acetate/vinyl chloride), TPO (thermoplastic olefin), TPR (thermoplastic rubber) and PEBA (polyether block amide).

In some embodiments, layer II 18 comprises polyolefin foam and layer I 16 comprises polyolefin plastic. Further, in some embodiments, layer III 20 comprises thermoplastic elastomer. In some embodiments, layer II 18 comprises thermoplastic elastomer, layer I 16 comprises polyolefin plastic, and layer III 20 comprises polyolefin foam. In some embodiments, the two layers 16, 18 can be co-extruded and then thermoformed into the liner 74. In some embodiments, each layer can be extruded individually, and the separate layers can be built-up and thermoformed.

The combination of foam and thermoplastic elastomer layers can be glued to a substrate 78 which may comprise of a paper/plastic ply, cardboard, plywood, plastic, metals, fiberglass, frp (fiberglass reinforced plastic) etc., which can limit any expansion and contraction of the layer I 16 and layer II 18. This would form an air gap 72 between layer II 18 in the joint 56, 58 and the substrate 78 it is getting bonded to. Layer I 16 and II 18 can stretch, compress and flex to receive oversized bricks 22 while sealing the brick 22 completely around the bottom of the vertical edge of the brick 22. The cavity 72 allows for layer I 16 and layer II 18 to flex even further. The thermoplastic elastomer typically has a high tear strength, abrasion resistant and is chemically resistant giving protection to polyolefin foam layer. With this combination, no expensive brick 22 grinding or waxing is needed saving in time and money.

In some embodiments, layer I 16 can be considered a release layer, for example being made from an elastomeric material. Desirably, the building materials used with the formliner will not adhere to the release layer. Thus, the layer I 16 can prolong the life of the formliner and allow the formliner to be used multiple times. In some embodiments, a release layer can comprise Styrenic Block Copolymers, Polyolefin Blends, Elastomeric Alloys or blends, Thermoplastic Polyurethanes, Thermoplastic Copolyester, Thermoplastic Polyamides and/or combinations thereof. In some embodiments, an elastomeric blend can comprise a thermoplastic elastomer and a polyolefin plastic, such as polypropylene and EPDM. A release layer is desirably thin, and will not interfere with flexion of the formliner. For example, a release layer can be less than 1/16" or less, 1/32" or less, etc.

In some embodiments, layer II 18 comprises a foam that is structurally suitable for use in the formliner. If too little foam is used, the formliner cannot flex to accommodate various sizes of bricks. If too much foam is used, the formliner becomes too bulky and bricks laid upon the formliner will move and be unstable if workers walk across the bricks. In some embodiments, a foam layer can be 3/8" thick or less. In some embodiments, a foam layer can be 1/4" thick, 1/8" thick or less. The thickness of the layer can be adjusted based upon the weight and elastic modulus of the foam to create desired properties in the formliner. For example, in testing, a foam layer of 0.014" having a weight of 2-4 PCF (pounds per cubic foot) and an elastic modulus of 30 ksi exhibited suitable flexibility and support strength, while a similar layer of 0.014" having a weight of 2-4 PCF (pounds per cubic foot) but an elastic modulus of 10 ksi did not have sufficient strength to adequately resist deformation under the weight of the concrete.

In some embodiments, layer III 20 comprises a reinforcement layer designed to provide reinforcing strength to the formliner. In some embodiments, a reinforcement layer is desirably less than 1/32" thick. In some embodiments, a reinforcement layer comprises a material having a yield stress greater than that of layer II 18. Desirably, the reinforcement layer will not interfere with flexion of the formliner. In some embodiments, a reinforcing layer can comprise a Polyolefin Plastic, ABS, PVC and/or combinations thereof. In some embodiments, a reinforcement layer comprises an elastic modulus in the range of 0-362 ksi.

In some embodiments, the liner 74 can comprise two layers of material. In some embodiments having two layers, I 16 and II 18, no layer III 20 is needed, for example where layer II 18 includes enough strength that a reinforcing layer 20 is not necessary. In some embodiments, a two layer formliner comprises a layer of foam having a weight of 6 PCF (pounds per cubic foot) or more. In some embodiments having two layers, II 18 and III 20, no layer I 16 is needed, for example where layer II 18 comprises a material that has adequate release characteristics.

In some embodiments, layer I 16 consists of a solid polyolefin plastic such as high density polyethylene (HDPE); layer II 18 consists of a polyolefin foam such as LDPE foam; and layer III 20 consists of a thermoplastic elastomer such as TPE/PVC. In some embodiments, these three layers 16, 18, 20 can be co-extruded together into one single sheet and then thermoformed into the liner 74.

Referring to FIGS. 8a-10a, in some embodiments, the layer I 16 and layer II 18 are co-extruded together and thermoformed separately from layer III 20. The combination of layers I and II 16, 18 and layer III 20 can then be bonded together, in some instances while still hot, to create an cavity 72 in the joint 56, 58 between layer II 18 and layer III 20. The cavity 72 allows for even further flex inward caused by extremely oversized bricks 22. The high density polyethylene can provide stability and reinforcement to the foam layer.

High density polyethylene plastic is very durable and flexible so the liner 74 will withstand being stripped away from the concrete 44 several times. It has excellent chemical resistance. It also gives support to the ribs so that contractors can walk on it without destroying the liner 74.

In some embodiments, layer II 18 is made from LDPE foam, which is very flexible and can compress very easily allowing the brick 22 to be oversized and still fit into the recessed area 54 between the joints 56, 58 as shown in FIG. 7; without riding the joints 56, 58; binding the joints 56, 58; or without the need to remove individual joint 56, 58 pieces as may be necessary in prior art liners. The polyolefin foam is flexible enough to create a true seal against the brick 22 so the cementous material 44 poured against it will not seep past the seal and flow to the face of the brick 22.

In some embodiments, layer III 20 comprises or consists of TPE/PVC which is a durable material that will endure abuse caused by cementous materials 44 and the rough bricks 22 within the liner 74. The elastomer stretches and allows oversized brick 22 to squeeze into the foam creating a true seal. It also has great abrasion resistance and flexural fatigue resistance so that the liner 74 can be used several times. The TPE/PVC also protects the foam with its excellent toughness, tear strength and excellent weather ability. These advanced features allow for great money savings in grinding and waxing of the brick 22 and save much money and labor by being able to reuse the liner 74 over and over. Furthermore, the thermoplastic elastomer can be formed into textures 46 that facilitate a natural look to the grout between the brick 22 or stone 22 or pavers 22.

In some embodiments, layer III 20 is planar in shape except for expansion/contraction grooves 64 optional air spaces 62 formed on the underside of the joints 56, 58. In this embodiment, layer I 16 retains the profile as depicted in FIGS. 8a-10a while layer III 20 is planar across the region spanning from an air space 62 to an expansion/contraction groove 64. Layer III 20, therefore, has indentations at air space 62 and expansion/contraction groove 64 but not between. As a result, portions of layer II 18 are enlarged to occupy the space between indented layer I 16 and layer III 20.

Some embodiments can comprise or consist of a thermoplastic elastomer thermoformed with a solid polyolefin plastic to make a liner 74 for embedding objects 22 into a poured wall 44 or making textures 46 and shapes into a poured wall 44.

Figure 9A:
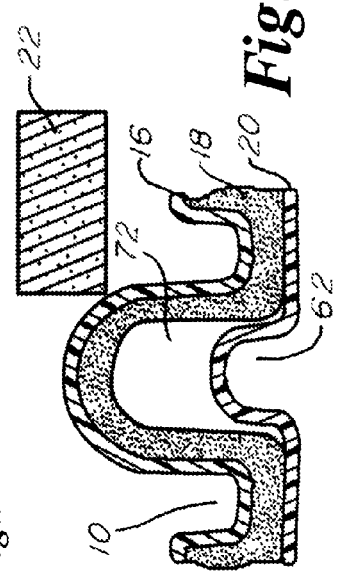
FIG. 9a. is an enlarged sectional view of FIG. 8 a. on the tooled joint, showing an embodiment having a closed cavity between the bottom layer and an adjacent layer.

In some embodiments, layer I 16 consists of the thermoplastic elastomer(s) and layer II 18 consists of a solid polyolefin plastic in the case of them being co-extruded together as shown in FIG. 9. In some embodiments, layer I 16 consists of a thermoplastic elastomer and layer III 20 consists of a solid polyolefin plastic as shown in FIG. 9a, where the sheets can be thermoformed separately creating a cavity 72 between layer II 18 and layer III 20. Any embodiment can include a cavity 72 between adjacent layers of material. The cavity 72 allows for the formliner to flex into the cavity 72 when an oversized brick 22 is place into the recessed area 54 between the joints 56, 58. The cavity 72 combined with a flexible material layer allows a brick to snuggly fit into the recessed area 54 between the joints 56, 58 while sealing around the brick 22 eliminating any need for waxing or grinding of the brick 22. In some embodiments, a polyolefin plastic gives the thermoplastic elastomer more stability so it cannot deform or deflect when walked on or when concrete 44 if poured and also keeps it from expanding and contracting. Some embodiments comprise PP/EPDM that can be thermoformed together with polypropylene wherein layer I 16 is PP/EPDM and layer II 18 is polypropylene, which in some embodiments can be talc filled, for example in the case of them being co extruded together as shown in FIG. 9. In some embodiments, layer I 16 consists of PP/EPDM and layer III 20 consists of talc filled polypropylene.

The process of thermoforming talc filled polypropylene and PP/EPDM separately and then bonding them together is called twin sheet vacuum forming Talc filled polypropylene has a very low coefficient of expansion from 2.22-4.44 (10-5 F-1) it is also low cost and the talc gives the polypropylene more rigidity to support the PP/EPDM layer. With polypropylene and PP/EPDM's ability to retain excellent mechanical properties in elevated temperatures during steam curing of the concrete 44 with very good fatigue resistance, good resistance to standard inexpensive release agents in the concrete industry, this liner 74 able to withstand multiple reuses gives great value to the contractor. Furthermore the EPDM can have a durometer as low as 35 shore A which allows this elastomer to flex and stretch at the same time to allow oversized brick 44 to seal against the joints 56, 58 when seated into the recessed area 54 between the plurality of joints 56, 58. With a true seal, an elimination of brick 22 grinding, brick waxing or any kind of retarder placed on the liner 74, lowers the cost and labor to make a poured wall 44 that embeds brick 22 pavers on the surface.

Structurally, an advantage of the liner 74 is its ability to contract and expand and remain usable at a construction site over a wide range of temperatures, from below zero to over 100 degrees Fahrenheit. Additionally, the liner 74 can withstand temperature changes caused by the cementous material 44, for example heat generated by the curing process can cause temperature changes of 40-60 degrees Fahrenheit. The expansion grooves 64, described below, allow the formliner to adjust for temperature change and to accept oversize or non-standard sized bricks.

Figure 10A:
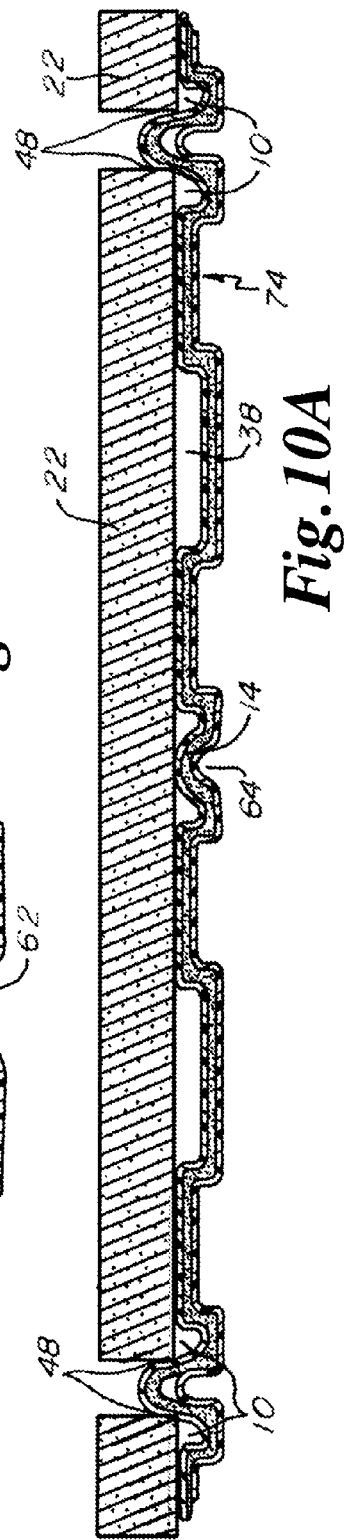
FIG. 10a. is a sectional view of FIG. 5 showing the bottom elevation and an embodiment of the liner having three layers. The top and bottom layers are represented with hatching and dashed lines. The figure illustrates an oversized brick from FIG. 8a. placed into the recessed area between the grout joints where in the grout joint structure has a closed cavity.

In some embodiments a liner 74 comprises a channel 10 or recess adjacent to the joints 56, 58 as shown in FIG. 1 and FIGS. 5-10a. The channel 10 is designed to follow each joint 56, 58 as shown in FIG. 1. The channel 10 is designed to allow the polyolefin foam and/or thermoplastic elastomer to flex, as shown in FIGS. 10 and 10a, because the base of the joint 56, 58 is not attached at the plane at which the object 22 is seated. Such channels 10 can run adjacent to any and all joints 56, 58.

In some embodiments a liner 74 comprises a plurality of expansion/contraction grooves 64 as illustrated in FIGS. 1, 4, 12 and 13. An expansion groove 64 can comprise an undulation in the formliner (see also FIG. 8). An upper surface of each expansion groove 64, or the upper surface of the formliner material located above an expansion groove 64, can be oriented at a height that is less than the predetermined height of the brick locations.

Figure 13:
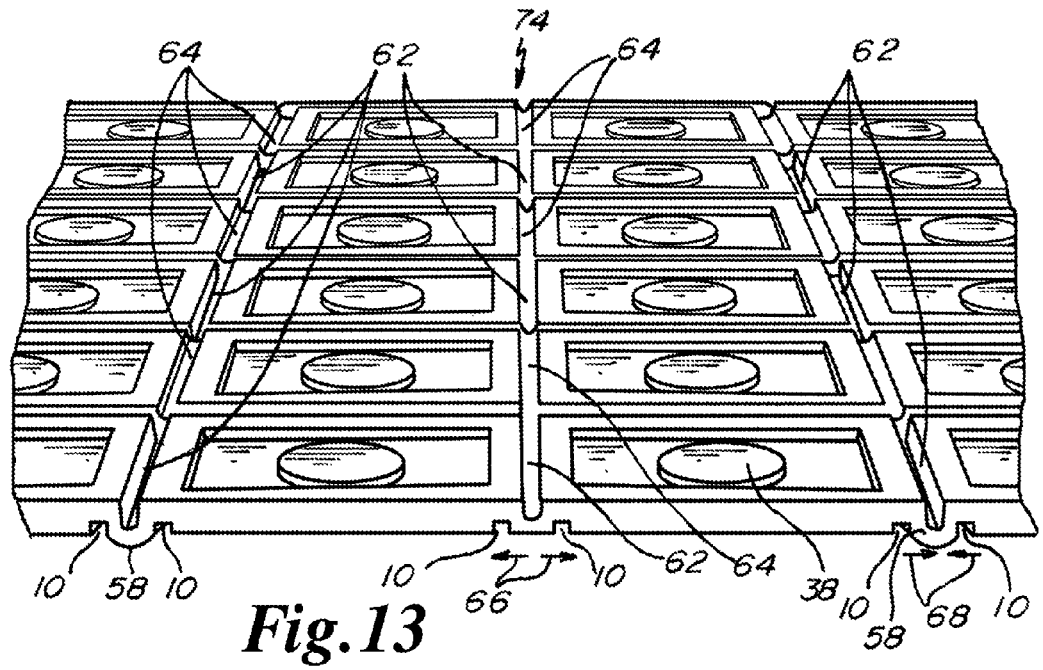
FIG. 13 is perspective view of an embodiment of the liner placed upside down illustrating the thermal expansion/contraction mechanism.

The grooves 64 can be formed on the underside of the liner 74 at any suitable location. In some embodiments, the grooves 64 are aligned under the columns 58. In some embodiments, air spaces 62 can be formed at some locations under the columns 58. It should be noted that due to the staggered brick pattern, a column 58 can define alternating raised portions and tray portions. The grooves 64 can be located under a tray portion, while the air spaces 62 can be located under the column 58 raised portions, for example as shown in FIG. 13. Thus, in some embodiments, a channel is formed under a column 58, comprising alternating airspaces 62 and expansion/contraction grooves 64. The cross-sectional area of the airspaces 62 can be different from the cross-sectional area of the expansion/contraction grooves 64. In some embodiments, the cross sectional area of the airspaces 62 on the underside of a vertical joint 58 is greater than the cross sectional area of the corresponding airspace on the underside of the expansion/contraction grooves 64. The underside of adjacent vertical joints 58 can be staggered, thus an airspace 62 of one vertical joint 58 can be horizontally aligned with expansion/contraction grooves 64 of adjacent vertical joints 58. The grooves 64 solve a problem of horizontal expansion 68 and contraction 66 (see FIG. 13), for example due to temperature change, as the airspaces 62 and grooves 64 can absorb the dimensional changes of the liner 74. The airspaces 62 and grooves 64 form a continuous vertical channel.

Figure 5:
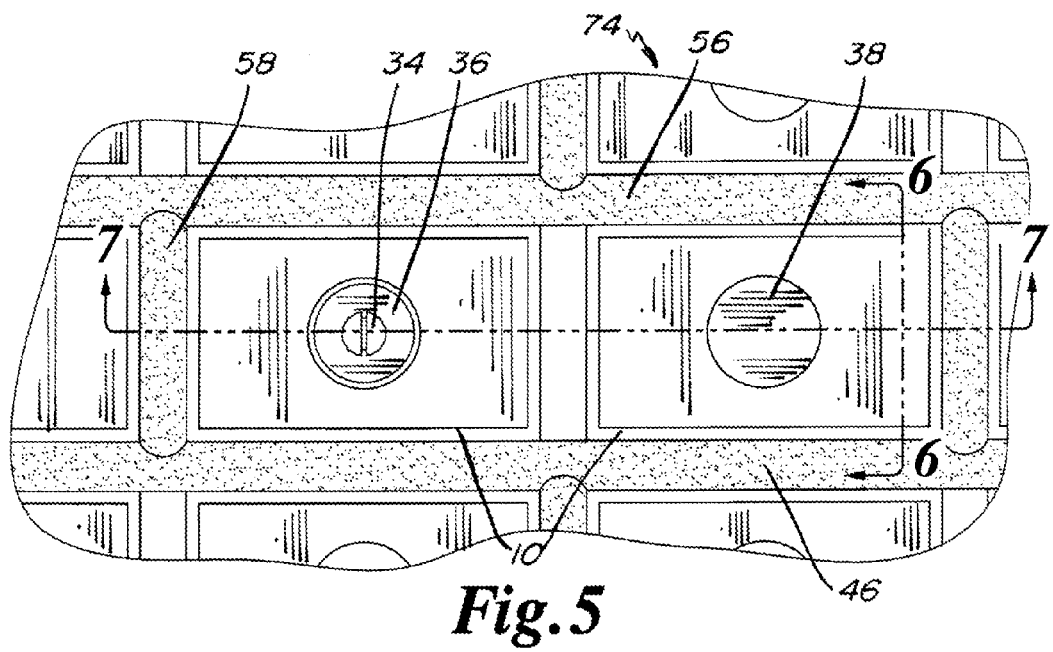
FIG. 5 is a cutaway section of the front elevation view of an embodiment of the liner with a screw and washer.

In some embodiments a liner 74 comprises a fastener pocket 38. FIGS. 1, 5 and 7 illustrate the pockets areas 38 that are formed within the recessed area 54 where the objects 22 can be disposed. These pockets 38 are made for fasteners 34 to sit under the object 22 being cast into a poured wall 44, for example to attach the liners 74 to forms. FIG. 5 shows a top view of the liner 74 illustrating the areas where a nail or screw 34 and washer 36 can be placed in order to fasten it to a form system 32. An upper surface of a fastener pocket 38 is recessed below the predetermined height of the brick location/recessed area 54. Preferably, the upper surface of a fastener pocket 38 is low enough that an upper surface of a fastener 34 is oriented at a height that is below the predetermined height of the brick location/recessed area 54.

Some embodiments comprise of joints 56, 68 in which a cavity 72 is formed between two layers 16, 18, or 20 of materials the make up the joint 56, 58 in the liner 74 as depicted in FIGS. 1, 8a-10a and 14. This cavity 72 allows for the layer of thermoplastic elastomer to stretch, flex and compress into or collapsing the cavity 72 as oversized bricks 22 are placed into the recessed area 54 between the plurality of joints 56, 58.

Figure 11:
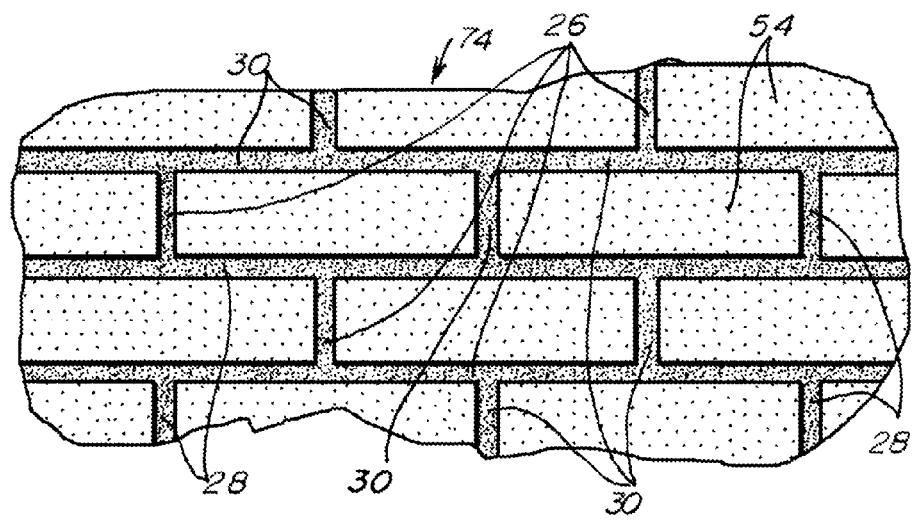
FIG. 11 is a front elevational view of an embodiment of the liner and only showing the various dimensions in the grout joints.
Figure 12:
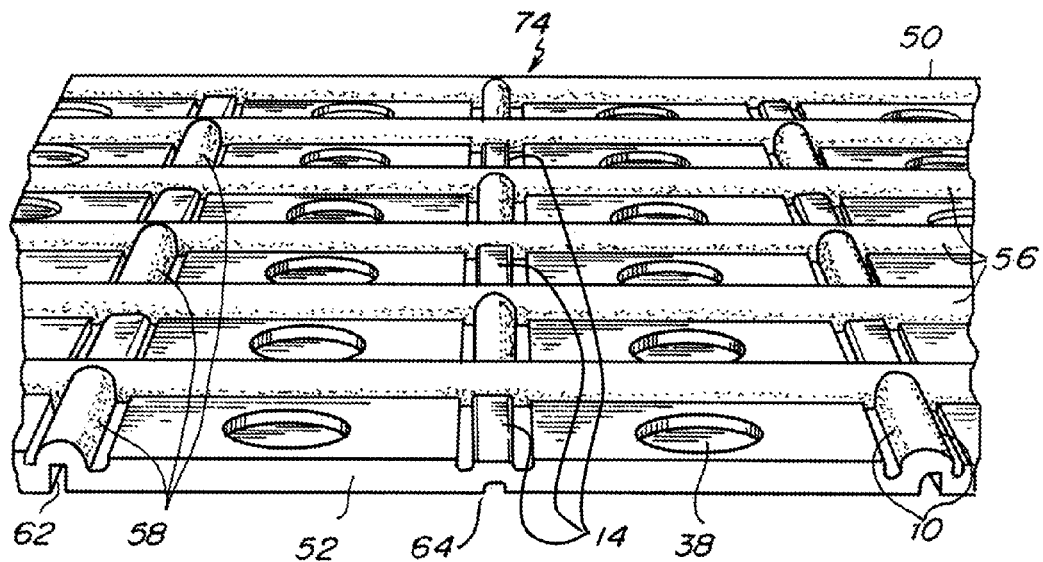
FIG. 12 is a perspective view of an embodiment of the liner apparatus showing the thermal expansion/contraction mechanism.

Referring to FIG. 11, in some embodiments a formliner can comprise varying grout widths 26, 28, 30 in the joints 56, 58. The liner 74 provides for varying grout widths 26, 28, 30 while the liner is in its native pre-stressed state (i.e., before bricks have been placed in the liner 74). This can be accomplished by changing the dimensions of the joints 56, 58 in the form, for example changing width dimensions, degree of curvature, etc. A wall made using a liner 74 arranged to produce varying widths 26, 28, 30 in the joints 56, 58 can look more like real masonry. The cavity or the recessed area 54 where the object 22 sits can remain the same dimensions, but the grout widths 26, 28, 30 can have different dimensions relative to one another. For example, FIG. 11 shows a three vertical joints 58 in one row of brick locations. One of the joints 58 can be the neutral dimension 28, one can be a plus dimension 30 and the other can be a negative dimension 26. Preferably, the overall dimension of each row of bricks in the formliner is equal—thus, width adjustment of grout joints can be selected to create equal overall dimensions. The same can be done for horizontal joints 56. One joint can be slightly wider 30 than the other as long as there is a narrower joint 26 to cancel out the positive dimension 30.

A slight variation in the width of grout joints 56, 58 creates a more natural looking wall that resembles hand-laid masonry.

In some embodiments, two separate liners 74 can be made for special cuts vertically and a liner 74 can be made for special cuts horizontally in order to facilitate custom sizes for a casting bed or form 32. The liner 74 for vertical cuts can have the same random width 26, 28, 30 along the horizontal row 56 as the original liner 74 with varying grout joint widths 26, 28, 30 along the horizontal row 56 but each vertical joint 58 would have the same width so that the liner 74 can be cut in a straight line and follow the vertical joints 58. When special cuts need to be made horizontally, the vertical joints 58 can be made to have random widths 26, 28, 30 and the horizontal joints can all be made with the same neutral width 28 in order to facilitate exact fitting into the form 32. The result is a natural looking brick wall with random width grout joints 26, 28, 30 as a mason would create when hand laying brick, in contrast to previous attempts at manufactured brick walls having uniform grout joints.

Figure 14:
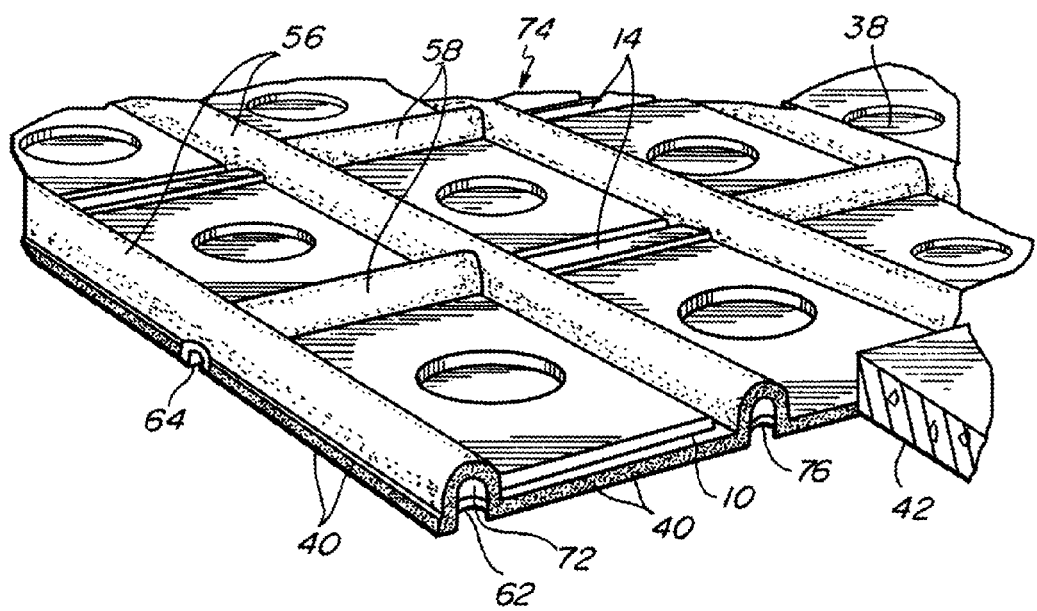
FIG. 14 is a perspective view of an embodiment of the liner from the bottom right corner showing the adhesive and illustrating the adhesive's protective strip being peeled off.
Figure 15:
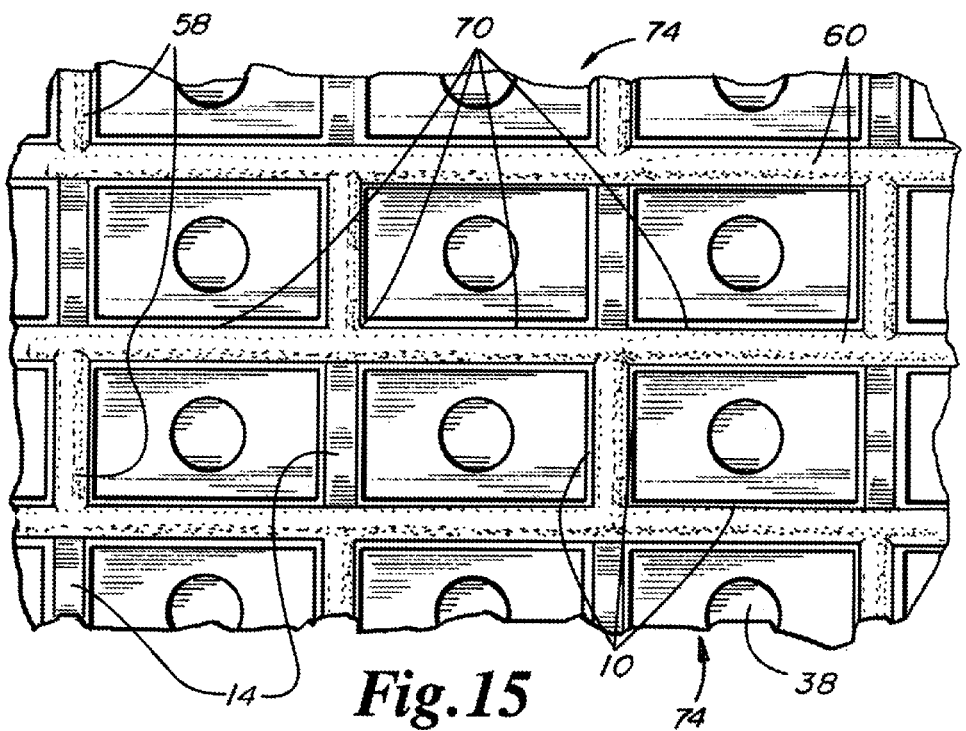
FIG. 15 is a front elevational view of two liners being joined together after the adhesive's protective strip has been peeled off.

In some embodiments, inventive liners 74 provide a solution for matching adjacent liners 74 when casting a wall using multiple liners 74. A liner 74 can comprise an adhesive 40 on one or more sides of the liner 74, as illustrated in FIG. 14. The liner 74 can be made into a larger liner 74 by matching two liners 74 side by side or top to bottom with one side having no full grouts 52 vertically and the matching side having a full grout 50 vertically and the top have no full grout 52 horizontally while the matching bottom side has a full grout 50 horizontally with the possibility of continuing to add on more liners 74 until a desired size is reached. The sides would be coated with an adhesive 40 with a protective layer 42 that would be pealed away exposing the adhesive 74. As shown in FIG. 15, the ends of adjacent liners 74 are butt together 70 with the joints 56, 58 properly aligned. The film that protects the adhesive 42 can be left on the sides of the liner 74 until it is ready to be placed into the form 32 and it can be used to attach to the sides of the form 32 in order to stop the any leakage of cement slurry 44 from migrating under the liner 74. By allowing a large liner 74 to be constructed prior to shipment to the contractor saves the contractor in labor and therefore reducing his time.

In some embodiments, a liner 74 can comprise a magnetic sheet 24 that is useful for attaching the liner 74 to building materials such as metallic flanges. In some embodiments, the aforementioned substrate 78 can comprise a magnetic material. The magnetic sheet 24 can be attached to the liner 74 using any suitable method, such as using an adhesive. The major advantage of this embodiment is that the end user does not have to drill holes in the steel form, which is very time consuming and very expensive to repair afterwards.

In some embodiments, the invention is directed to methods of making liners 74 as disclosed herein.

In some embodiments, for example a liner 74 comprising a single material, the material can be extruded to form a precursor sheet, and the precursor sheet can be thermoformed in a mold, for example under heat and pressure, to form the liner 74. In some embodiment, the precursor sheet can be pre-heated to a predetermined temperature while disposed in the mold, and after reaching the predetermined temperature, pressure can be applied. The mold can be used to impart the shapes and structural features of the liner 74 as disclosed herein.

In some embodiment, for example a liner 74 comprising multiple layers of material, the multiple layers can be co-extruded to form a sheet, and the sheet can be thermoformed in a mold, for example under heat and pressure, to form the liner 74. When more than two layers are desired, in some embodiments, all of the layers can be co-extruded simultaneously. In some embodiments, for example when a co-extrusion machine is only capable of co-extruding two materials simultaneously, a first layer and a second layer can be co-extruded to form an intermediate sheet, and the intermediate sheet can be fed through the machine while co-extruding one or more layers to form the precursor sheet, which can then be thermoformed in a mold to form the liner 74.

In some embodiments, a liner 74 can be thermoformed as described above, and then attached to a substrate, for example to provide structural reinforcement to the liner 74.

In some embodiments, for example a liner 74 comprising multiple layers of material, the layers can be thermoformed individually, and the two layers can be brought together under conditions that cause the layers to adhere to one another. In some embodiments, at least one layer can be at a temperature above its glass transition temperature when the layers are placed in contact. In some embodiments, both layers can be above their individual glass transition temperatures. In some embodiments, the layers can be secured using an adhesive, such as glue, pressure sensitive adhesive, adhesive tape, etc.

In some embodiments, for example when a cavity 72 is disposed between individual layers 16, 18, 20 of a liner 74, a first portion and a second portion can each be formed as described above, and the two portions attached to one another. For example, with reference to FIG. 9a, a first portion 92 can comprise a first layer 16 and a second layer 18. The second portion 94 can comprise a third layer 20. The first portion 92 can be formed as described above, as well as the second portion 94, and the two portions 92, 94 attached to one another. In some embodiments, the material used to form the first layer 16 and the second layer 18 can be co-extruded to form a first precursor sheet, and the material used to form the third layer 20 can be extruded to form a second precursor sheet. The first and second precursor sheets can each be thermoformed in separate molds, for example under heat and pressure, thereby imparting the individual shapes to the first portion 92 and the second portion 94. The two portions 92, 94 are then attached to one another. In some embodiments, the two portions 92, 94 can be placed in contact under adherent conditions, for example prior to cooling after the molding process, wherein the materials of the portions 92, 94 can adhere to one another.

Further, some embodiments comprise a reinforcing layer III 20. In some embodiments the reinforcing layer can be comprised of a polyolefin plastic material such as EVA, PE, PP; ABS (acrylonitrile butadiene styrene), PS (polystyrene), PVC, ASA/PVC (acetylsalicylic acid/polyvinyl chloride), PC (polycarbonate), CA (cellulose acetate), CP (cellulose Propionate), PA (polyamide), PAR (polyarylate), CAB (cellulose acetate butyrate), or paper. In some embodiments, layer II 18 comprises a crosslinked closed cell thermoplastic polyolefin foam material such as LDPE or EVA. Finally, in some embodiments, a first layer 16 comprises a thermoplastic elsastomer (TPE) or thermoplastic rubber (TPR) materials, such as: styrenic block copolymers, polyolefin blends, elastomeric alloys, thermoplastic polyurethanes, thermoplastic copolyester, thermoplastic polyamides. Specifically, the material can comprise an elastomeric alloy such as PP/EPDM.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A formliner for casting a brick wall comprising:
    an area of foam material comprising a plurality of row members and column members defining a grid, the grid defining a plurality of brick locations, an upper surface of each brick location having a predetermined height, each of said upper surfaces comprising said foam, each row member and each column member comprising a raised portion raised above the predetermined height, each raised portion comprising an airspace in an underside of the formliner, said airspace extending above said predetermined height; and
    a layer of reinforcing material having a yield stress greater than that of said foam material, said layer of reinforcing material comprising a lower surface of said formliner.

2. The formliner of claim 1, wherein each raised portion comprises an arcuate shape.

3. The formliner of claim 1, formed by a process comprising providing a sheet comprising said foam material and said reinforcing material and thermoforming the sheet.

4. The formliner of claim 1, wherein said foam material is continuous across said area.

5. The formliner of claim 1, wherein said foam comprises a polyolefin.

6. The formliner of claim 5, wherein said layer of reinforcing material comprises a solid plastic.

7. The formliner of claim 1, further comprising a layer of elastomeric material.

8. The formliner of claim 1, comprising a magnetic material.

9. A formliner for casting a brick wall comprising:
    an area of foam material comprising a plurality of row members and column members defining a grid, the grid defining a plurality of brick locations, an upper surface of each brick location having a predetermined height, each of said upper surfaces comprising said foam, each row member and each column member comprising a raised portion raised above the predetermined height; and
    a layer of reinforcing material having a yield stress greater than that of said foam material, said layer of reinforcing material comprising a lower surface of said formliner;
    further comprising a fastener pocket recessed beneath said predetermined height.

10. A formliner for casting a brick wall comprising:
    an area of material comprising a plurality of rows and columns defining a grid, the grid defining a plurality of brick locations, each row comprising a raised portion, each column comprising alternating raised portions and tray portions;
    the area of material comprising a first layer and a second layer coextensive with the first layer, the second layer comprising a polyolefin foam, the first layer comprising a reinforcing material having a yield stress greater than that of the polyolefin foam;
    further comprising a third layer coextensive with the second layer, the third layer comprising an elastomer.

11. The formliner of claim 10, wherein the second layer comprises a cross-linked, closed cell polyolefin foam and the third layer comprises a blend of thermoplastic elastomer and polyolefin plastic.

* * * * *